Feb. 2, 1926.

W. S. PARRISH

STOCK RING

Filed Jan. 24, 1925

1,571,867

Willis S. Parrish
INVENTOR

BY Victor J. Evans
ATTORNEY

WITNESS: J. T. L. Wright

Patented Feb. 2, 1926.

1,571,867

UNITED STATES PATENT OFFICE.

WILLIS S. PARRISH, OF CAVE CITY, KENTUCKY.

STOCK RING.

Application filed January 24, 1925. Serial No. 4,601.

*To all whom it may concern:*

Be it known that I, WILLIS S. PARRISH, a citizen of the United States, residing at Cave City, in the county of Barren and State of Kentucky, have invented new and useful Improvements in Stock Rings, of which the following is a specification.

This invention relates to stock rings especially adapted for hogs, an object being to provide a ring which will prevent hogs from breaking or burrowing through an enclosure so that they may be retained within a desired pasture or pen.

Another object of the invention is the provision of a device of this character which in addition to the above stated function will prevent rooting.

A further object of the invention is the provision of a stock ring which is simple in construction and which may be readily and securely attached.

With the above and other objects in view, the invention further includes the following novel features and details of construction, to be hereinafter more fully described, illustrated in the accompanying drawings and pointed out in the appended claims.

In the drawings:—

Figure 1:
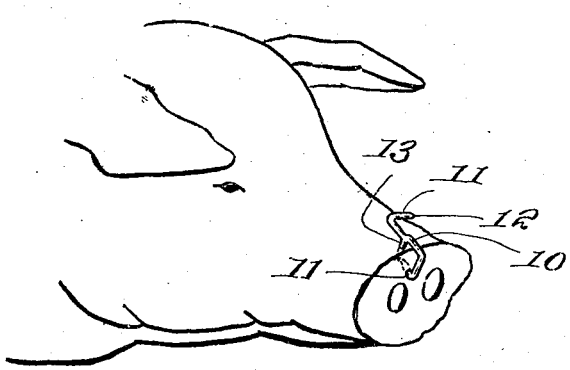
Figure 1 is a view illustrating the invention in position for use.
Figure 3:
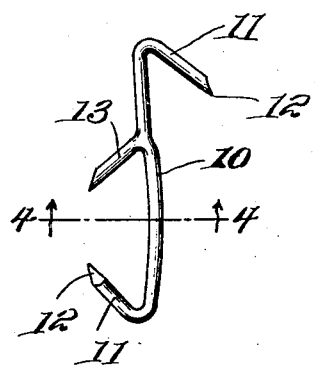
Figure 3 is a similar view showing the invention applied.

Referring to the drawings in detail wherein like characters of reference denote corresponding parts, the device as shown comprises a substantially straight body portion 10 which may be formed of wire or suitable material. Extending outwardly and rearwardly from the opposite ends of the body portion 10 are angularly disposed prongs 11 having pointed or penetrating ends 12. These prongs are bent at an acute angle with respect to the body portion and extend in opposite directions. That is, the prong at one end extends from the opposite side of the prong at the opposite end.

Extending from the intermediate portion of the body portion 10 is a prong 13 which is similar to the prongs 11 and which extends toward the prong upon whose side of the body portion it is located so that the pointed ends of one of the prongs 11 and the prong 13 extend inwardly or toward one another.

Figure 2:
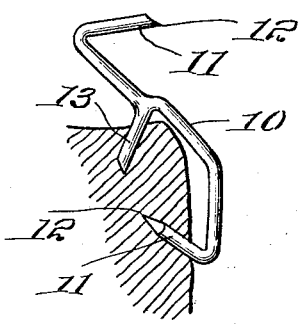
Figure 2 is an elevation of the invention before it is applied.
Figure 4:
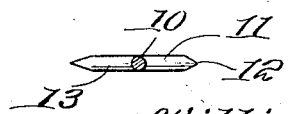
Figure 4 is a section on the line 4—4 of Figure 3.

In applying the device, the prong 13 and one of the prongs 11 are inserted in the snout of the animal by bending the body portion 10 between the prong 11 and the prong 13 as shown in Figure 2 of the drawings. The other prong 11 will thus be spaced upwardly from the snout and have its pointed end disposed outwardly substantially on a line with the end of the snout. Should the animal attempt to root or burrow beneath a fence or enclosure, the upper prong 11 will strike said fence or enclosure and cause the prong 13 and the other prong 11 to be forced into the snout in such manner as to prick the animal and cause him to quickly abandon his purpose. Rooting in the ordinary manner will also be prevented by the device.

One or more of the devices may be employed and while only one is shown attached to the snout of the hog, it is obvious that an additional device may be placed upon each side of the one shown.

The invention is susceptible of various changes in its form, proportions and minor details of construction and the right is herein reserved to make such changes as properly fall within the scope of the appended claims.

Having described the invention what is claimed is:—

1. A stock ring comprising a substantially straight body portion, angular and oppositely disposed rearwardly and outwardly extending prongs at opposite ends of said portion and an intermediate prong extending from the body portion upon the same side and toward the outer end of one of the prongs.

2. A stock ring comprising an angular bending attaching member and a rearwardly, upwardly and forwardly disposed substantially V-shaped member extending from the attaching member above the snout of the animal.

In testimony whereof I affix my signature.

WILLIS S. PARRISH.